United States Patent
Bertelsmann et al.

(10) Patent No.: US 8,378,642 B2
(45) Date of Patent: Feb. 19, 2013

(54) POWER FEED APPARATUS AND OPERATING METHOD

(75) Inventors: Götz-Martin Bertelsmann, Wangen (DE); Robert Hottendorf, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 713 days.

(21) Appl. No.: 12/624,810

(22) Filed: Nov. 24, 2009

(65) Prior Publication Data

US 2010/0127577 A1 May 27, 2010

(30) Foreign Application Priority Data

Nov. 27, 2008 (DE) .......................... 10 2008 059 428

(51) Int. Cl.
*H02P 9/00* (2006.01)

(52) U.S. Cl. ........................................... 322/28; 322/37

(58) Field of Classification Search .................. 322/22, 322/23, 28, 37, 100; 290/44
See application file for complete search history.

(56) References Cited

U.S. PATENT DOCUMENTS

| 5,483,147 | A  | * | 1/1996 | Ilic et al. .......................... 322/25 |
| 6,090,961 | A  |   | 7/2000 | Hanaoka et al. |
| 6,285,168 | B1 | * | 9/2001 | Davis .............................. 322/20 |
| 6,294,898 | B2 | * | 9/2001 | Lawson et al. .................. 322/20 |
| 7,966,103 | B2 | * | 6/2011 | Jorgensen et al. ............ 700/297 |
| 8,004,251 | B2 | * | 8/2011 | van Zyl ........................... 322/36 |

* cited by examiner

*Primary Examiner* — Nicholas Ponomarenko
(74) *Attorney, Agent, or Firm* — Laurence A. Greenberg; Werner H. Stemer; Ralph E. Locher

(57) ABSTRACT

A solar module has a solar generator for generating electrical power, and an inverter for feeding the electrical power produced by the solar generator into a power supply system or to one or more loads. An input load is connected in parallel with the solar generator. A control apparatus controls the operation of the inverter such that it measures a difference voltage between the loaded and the unloaded solar generator, weights this difference voltage with a factor, and operates the inverter only when the weighted difference voltage corresponds at most to a threshold voltage.

20 Claims, 1 Drawing Sheet

POWER FEED APPARATUS AND OPERATING METHOD

CROSS-REFERENCE TO RELATED APPLICATION

This application claims the priority, under 35 U.S.C. §119, of German application DE 10 2008 059 428.8, filed Nov. 27, 2008; the prior application is herewith incorporated by reference in its entirety.

BACKGROUND OF THE INVENTION

Field of the Invention

The present invention relates to a power feed apparatus, in particular to a power feed apparatus having a generator for generating electrical power and having a feed apparatus for feeding the electrical power produced by the generator into a power supply system or to at least one load. The invention further relates to a method for controlling the operation of such a power feed apparatus.

As an example of a power feed apparatus, a solar module normally has a solar generator with at least one solar cell for conversion of incident radiation to electrical power, at least one energy storage capacitor which is connected in parallel with the solar generator, and a solar inverter for feeding the electrical power produced by the solar generator into a power supply system or to at least one load. In this case, the solar inverter should start to feed power into the power supply system only when the power of the solar generator is sufficiently high to compensate for the no-load losses of the solar inverter, since otherwise the power which is still lacking would be drawn from the power supply system, causing unnecessary losses.

One known approach for solving this problem is to connect the solar inverter only when the solar generator voltage exceeds a predetermined threshold value. One problem in this case is that the no-load voltage of the solar generator provides little information about its possible power for feeding into a power supply system. It is therefore possible for adequate power to be available even below the threshold value, which in this case is not used. On the other hand, the situation can also occur in which the power of the solar generator is too low despite the voltage threshold value being exceeded (for example in the event of partial shadowing of the solar cells). In order to prevent power from being drawn unnecessarily from the power supply system with this constellation, the solar inverter must be switched off again. In poor lighting conditions (for example in the event of weather with precipitation), this can lead to the solar inverter being switched on and off repeatedly, causing the relays to close, and causing noise.

A second solution approach is known in which the generator is loaded with a resistance. In this case, however, for desired good operation, the constant value of the resistance must be matched to the generator respectively used by the customer and to other constraints (for example the power supply system voltage, the lighting conditions), which is highly complex and considerably increases the production costs.

SUMMARY OF THE INVENTION

It is accordingly an object of the invention to provide a energy supply device which overcome the above-mentioned disadvantages of the heretofore-known devices and methods of this general type and which provides for an improved power feed apparatus that operates the power feed only when the power of the generator (e.g., solar generator) is sufficient.

With the foregoing and other objects in view there is provided, in accordance with the invention, a power feed apparatus, comprising:
  a generator for generating electrical energy;
  a feed apparatus connected to said generator for feeding the electrical energy produced by said generator into a power supply system or to a load;
  an input load connected to said feed apparatus in parallel with said generator; and
  a control apparatus for controlling an operation of said feed apparatus and configured to:
    determine a difference voltage between said generator in an unloaded condition and said generator in a loaded condition wherein said generator is connected with said input load;
    weight the difference voltage with a factor (preferably different from 1, preferably greater than 1) to form a weighted difference voltage; and
    operate said feed apparatus only when the weighted difference voltage corresponds at most to a limit voltage.

In other words, the objects are achieved, in accordance with the invention, by way of a power feed apparatus having a generator for the production of electrical power and a feed apparatus for feeding the electrical power produced by the generator into a power supply system or to one or more loads. An input load is connected in parallel with the generator. A control apparatus for controlling the operation of the feed apparatus is designed such that it can measure a difference voltage between the unloaded generator and the generator loaded with the input load, can weight this difference voltage with a factor and can operate the feed apparatus only when the weighted difference voltage corresponds at most to a threshold voltage (i.e., limit voltage). In one preferred and advantageous alternative, the factor is not equal to 1, and it is particularly advantageous for the factor to be greater than 1.

According to the invention, a control apparatus is provided in order to control the operation of the feed apparatus and is designed to measure a difference voltage between the unloaded generator and the generator loaded with the input load, to weight this difference voltage with a factor, preferably with a factor which is not equal to 1, in particular with a factor which is greater than 1, and to operate the feed apparatus only when the weighted difference voltage corresponds at most to a limit voltage. This embodiment of the control apparatus ensures, in a simple manner, that the feed apparatus is activated only when the power of the generator is sufficiently high. On the other hand, power is fed into the power supply system or to a load even at generator power levels which are relatively low but are in fact adequate, thus improving the effectiveness of the power feed apparatus. In this case, a relatively accurate prediction of the actual available power is calculated. In the system according to the invention, the input load can, furthermore, be designed to be considerably lower than the load corresponding to the self-consumption of the feed apparatus. This reduces the physical volume, waste heat and costs of the input load, which is advantageous in particular in the case of relatively high generator power levels. Furthermore, this avoids unnecessary relay switching.

By way of example, the power feed apparatus can advantageously be used for a solar module. In this case, the generator is a solar generator having at least one solar cell, and the feed apparatus is a solar inverter. However, the invention is not restricted to this application option and can also be used in other ways. For example, the power feed apparatus may contain generators for production of electrical power from radiation, mechanical energy, kinetic energy and the like, and may have feed apparatuses with or without transformers with inverters, rectifiers or without converter elements.

In one refinement of the invention, the limit voltage may depend on a no-load voltage of the generator and/or on a minimum required input voltage of the feed apparatus. By way of example, the limit voltage may be the difference voltage between the no-load voltage of the generator and the minimum required input voltage of the feed apparatus.

In a further embodiment of the invention, the factor may depend on a ratio of a self-consumption power to an input-load power of the power feed apparatus and/or on a load-dependent behavior of the generator. In addition, the factor may have a fixed predetermined value or may be a variable factor. In one preferred embodiment, the factor may, for example, be in the form of a self-learning factor.

In yet another embodiment of the invention, the control apparatus may be integrated in the feed apparatus.

With the above and other objects in view there is also provided, in accordance with the invention, a method for controlling an operation of a power feed apparatus having a generator for generating electrical power, a feed apparatus for feeding the electrical energy from the generator into a power supply system or to at least one load, and an input load connected in parallel with the generator. The novel method comprises the following steps:

measuring a difference voltage between the generator in an unloaded condition and the generator loaded with the input load;

weighting the difference voltage with a factor to form a weighted difference voltage;

comparing the weighted difference voltage with a threshold voltage; and operating the feed apparatus only when the weighted difference voltage does not undershoot the threshold voltage.

The various embodiments of the invention outlined above may, of course, be combined with one another in any desired manner. Other features which are considered as characteristic for the invention are set forth in the appended claims.

Although the invention is illustrated and described herein as embodied in a power feed apparatus and an operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
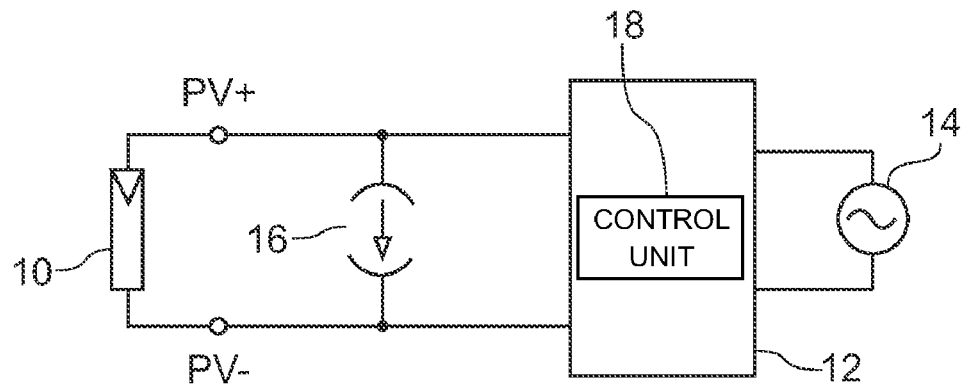
FIG. 1 shows a highly simplified block diagram of a power feed apparatus according to the present invention.

Referring now to the figures of the drawing in detail and first, particularly, to FIG. 1 thereof, there is shown the design of a power feed apparatus according to the invention. The invention is described in more detail using the example of a solar module. As mentioned above, the present invention is, however, not limited to this application.

The solar module contains a solar generator 10 with at least one solar cell for the conversion of incident radiation to electrical power, and a solar inverter 12 for feeding the power produced by the solar generator 10 into a power supply system 14 or to at least one load. As illustrated in FIG. 1, the solar module is furthermore provided with an input load 16, which is connected in parallel with the solar generator 10 and with an energy storage capacitor which may likewise be provided. This input load 16 may be designed to be less than the load which corresponds to the self-consumption of the inverter 12. This reduces the physical volume, waste heat and costs of the input load 16, and therefore those of the entire power feed apparatus. This is particularly advantageous for high generator power levels.

This power feed apparatus furthermore has a control apparatus 18 for controlling the operation of the solar module, in particular of its inverter 12. The control apparatus 18 is preferably integrated in the solar inverter 12 and, for example, is in the form of a microcontroller.

Figure 2:
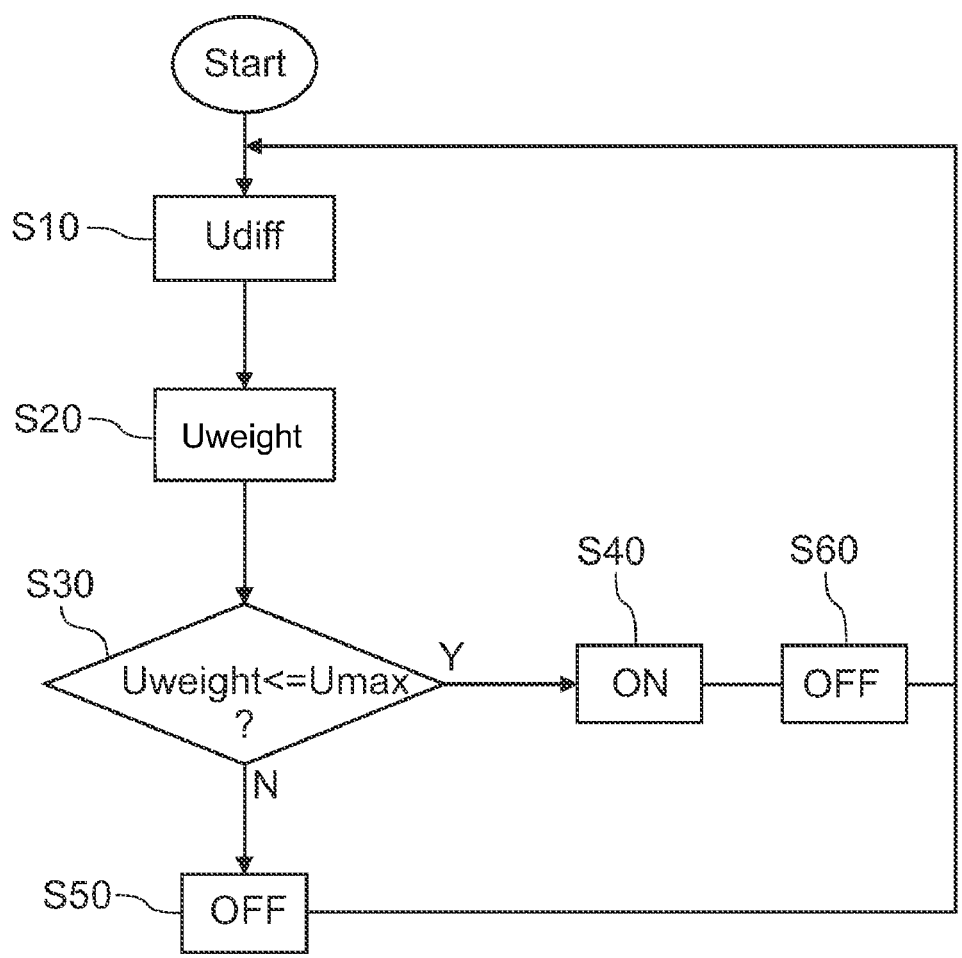
FIG. 2 shows a flowchart in order to explain the method of operation of the power feed apparatus shown in FIG. 1, according to a preferred exemplary embodiment of the invention.

The method of operation of this power feed apparatus will now be explained in more detail with reference to the flow chart shown in FIG. 2.

During the operation of the power feed apparatus, the activation and deactivation of the feed apparatus 12, that is to say in this example of the solar inverter, are continuously monitored and controlled by the control apparatus 18 in the manner described in the following text.

Before the inverter 12 is activated, the control apparatus 18 uses the input load to first of all measure a voltage $U_{no\text{-}load}$ on the unloaded generator 10, and a voltage $U_{load}$ on the generator 10 when loaded with the input load 16. It then uses these two voltage values $U_{no\text{-}load}$ and $U_{load}$ to calculate the difference voltage $U_{diff}$ in step S10, using the following equation:

$$U_{diff} = |U_{load} - U_{no\text{-}load}| \quad (1)$$

This difference voltage $U_{diff}$ is weighted with a factor F in a next step S20, with the factor F preferably not being equal to 1, and in particular with the factor F being greater than 1:

$$U_{weight} = F \cdot U_{diff} = F \cdot |U_{load} - U_{no\text{-}load}| \text{ where } F \neq 1 \quad (2)$$

This factor F depends on the ratio of the self-consumption power to the input-load power, and on the load-dependent generator behavior. The self-consumption power and the input-load power of the power feed apparatus are predetermined values which are obtained from the loads connected to the inverter 12 and the dimension of all of the components in the apparatus.

Depending on the embodiment of the solar module and in general of the power feed apparatus, this factor F is a constant, fixed, predetermined numerical value or a variable parameter. In the last-mentioned case, the factor F may be calculated as a function using operating parameters of the power feed apparatus. By way of example, these operating parameters are the temperature, the power supply system voltage, etc. In a further embodiment variant, the factor F may also be in the form of a self-learning factor, that is to say the control apparatus 18 matches the factor F to the circumstances automatically over the course of time, in order to optimize it. Once the weighting factor F has been chosen appropriately, the various tolerances of the entire system can also be taken into account.

In a next step S30, the control apparatus 18 compares the determined weighted difference voltage $U_{weight}$ with a threshold voltage (also referred herein as the limit voltage) $U_{max}$. If the weighted difference voltage $U_{weight}$ is less than or equal to the limit voltage $U_{max}$, this means that the generator power is sufficiently high to operate the feed apparatus 12. In step S40, the control apparatus 18 therefore activates the solar inverter 12 and deactivates the input load 16. In contrast, if the weighted difference voltage $U_{weight}$ is greater than the limit voltage $U_{max}$, then the solar inverter 12 is not activated by the control apparatus 18 (step S50).

Once the feed apparatus 12 has been activated, the control apparatus 18 monitors the input power of the feed apparatus 12. If the input power of the feed apparatus 12 falls to the self-consumption value of the feed apparatus 12, the control apparatus 18 switches the feed apparatus 12 off (step S60), with the latter then being in a standby mode.

The steps S10 to S50 described above are repeated further while the power feed apparatus is in the standby mode, in order to control the activation of the feed apparatus 12 as optimally as possible. On the one hand, even low power values should be fed into the power supply system if this is possible, and on the other hand frequent switching on and off of the relays should be avoided.

The limit voltage $U_{max}$, which is used in step S30 by the control apparatus 18 for comparison with the weighted difference voltage $U_{weight}$ depends, for example, on the source no-load voltage $U_{no-load}$, that is to say on the voltage value of the unloaded generator 10 and on the minimum required input voltage $U_{in}$ of the feed apparatus 12. In one exemplary embodiment, the limit voltage $U_{max}$ is the difference between the source no-load voltage $U_{no-load}$ and the minimum required input voltage $U_{in}$ of the inverter 12:

$$U_{max} = U_{no-load} - U_{in} \quad (3)$$

The minimum required input voltage $U_{in}$ is a voltage value which can vary dynamically and in general depends on the predetermined power supply system voltage, which is in any case measured continuously by the control apparatus 18 for monitoring purposes.

The power feed apparatus according to the invention makes it possible to feed even low power levels into a power supply system 14, in that the feed apparatus 12 is activated at that time when the power available from the generator 10 corresponds to the self-consumption of the feed apparatus 12, or exceeds it. At the same time, excessively frequent switching of the relays, for example in the event of fluctuating conditions and generator power levels, is avoided.

The invention described above is particularly advantageous for power feed apparatuses in which the generators 10 produce fluctuating power levels, as is the case by way of example with solar generators. Furthermore, the power feed apparatus according to the invention can also advantageously be effectively used for feed apparatuses 12 without transformers.

The invention claimed is:

1. A power feed apparatus, comprising:
   a generator for generating electrical energy;
   a feed apparatus connected to said generator for feeding the electrical energy produced by said generator into a power supply system or to a load;
   an input load connected to said feed apparatus in parallel with said generator; and
   a control apparatus for controlling an operation of said feed apparatus and configured to:
   determine a difference voltage between said generator in an unloaded condition and said generator in a loaded condition wherein said generator is connected with said input load;
   weight the difference voltage with a factor to form a weighted difference voltage; and
   operate said feed apparatus only when the weighted difference voltage corresponds at most to a limit voltage.

2. The power feed apparatus according to claim 1, wherein the factor is not equal to 1.

3. The power feed apparatus according to claim 2, wherein the factor is greater than 1.

4. The power feed apparatus according to claim 1, wherein the limit voltage depends on a no-load voltage of the generator.

5. The power feed apparatus according to claim 1, wherein the limit voltage depends on a minimum required input voltage of said feed apparatus.

6. The power feed apparatus according to claim 1, wherein the limit voltage is a difference voltage between a no-load voltage of said generator and a minimum required input voltage of said feed apparatus.

7. The power feed apparatus according to claim 1, wherein the factor depends on a ratio of a self-consumption power to an input-load power of said power feed apparatus.

8. The power feed apparatus according to claim 1, wherein the factor depends on a load-dependent behavior of said generator.

9. The power feed apparatus according to claim 1, wherein the factor has a fixed predetermined value.

10. The power feed apparatus according to claim 1, wherein the factor is a variable factor.

11. The power feed apparatus according to claim 1, wherein said control apparatus is configured to adapt the factor in a self-learning manner.

12. The power feed apparatus according to claim 1, wherein said control apparatus is integrated in said feed apparatus.

13. A method for controlling an operation of a power feed apparatus having a generator for generating electrical power, a feed apparatus for feeding the electrical energy from the generator into a power supply system or to at least one load, and an input load connected in parallel with the generator, the method which comprises:
   measuring a difference voltage between the generator in an unloaded condition and the generator loaded with the input load;
   weighting the difference voltage with a factor to form a weighted difference voltage;
   comparing the weighted difference voltage with a threshold voltage; and
   operating the feed apparatus only when the weighted difference voltage does not undershoot the threshold voltage.

14. The method according to claim 13, which comprises using a factor not equal to 1 in the weighting step.

15. The method according to claim 13, which comprises using a factor greater than 1 in the weighting step.

16. The method according to claim 13, wherein the threshold voltage depends on a no-load voltage of the generator and/or on a minimum required input voltage of the feed apparatus.

17. The method according to claim 13, wherein the threshold voltage is a difference voltage between a no-load voltage of the generator and a minimum required input voltage of the feed apparatus.

18. The method according to claim 13, wherein the factor depends on at least one of a ratio of a self-consumption power to an input-load power of the power feed apparatus, and a load-dependent behavior of the generator.

19. The method according to claim 13, wherein the factor has a fixed predetermined value or the factor is a variable factor.

20. The method according to claim 13, wherein the factor is in the form of a self-learning factor.

* * * * *